United States Patent [19]

Honda

[11] Patent Number: 4,483,730

[45] Date of Patent: Nov. 20, 1984

[54] PLYWOOD MANUFACTURING METHOD AND APPARATUS

[75] Inventor: Noriyuki Honda, Ohbu, Japan

[73] Assignee: Meinan Machinery Works, Inc., Ohbu, Japan

[21] Appl. No.: 449,758

[22] Filed: Dec. 14, 1982

[30] Foreign Application Priority Data

Dec. 30, 1981 [JP] Japan ................................ 56-210636

[51] Int. Cl.[3] ....................... B32B 31/00; B29C 25/00; B65C 9/25; C09J 5/00

[52] U.S. Cl. .................................... 156/242; 156/246; 156/249; 156/306.6; 156/322; 156/324.4; 144/344; 264/234

[58] Field of Search ............... 144/332, 344, 348, 346; 156/246, 249, 307.5, 307.7, 307.4, 313, 331.7, 328, 324.4, 231, 303, 242, 300, 306.9; 428/511, 541; 264/204, 237, 234, 216, 217, 164, 175, 213, 299; 427/420, 348, 444

[56] References Cited

U.S. PATENT DOCUMENTS

| | | | |
|---|---|---|---|
| 1,440,371 | 1/1923 | Britton | 264/175 |
| 2,062,650 | 12/1936 | Hellmers | 264/175 |
| 3,026,190 | 3/1962 | McMahon et al. | 264/204 |
| 3,660,549 | 5/1972 | Hawkins | 264/216 |
| 3,788,923 | 1/1974 | Soliman | 156/306.6 |
| 3,990,876 | 11/1976 | Heymes | 156/246 |
| 4,104,103 | 8/1979 | Tarullo | 156/324.4 |
| 4,169,005 | 9/1979 | Fogle et al. | 144/348 |
| 4,374,692 | 2/1983 | Sümeghy | 144/344 |

*Primary Examiner*—Edward Kimlin
*Assistant Examiner*—Louis Falasco

[57] ABSTRACT

A plywood is manufactured by applying an aqueous plywood adhesive fluid to the peripheral surface of a heating roll rotating at a given speed by means of a roll coater to form an adhesive fluid film, drying the adhesive fluid film into a tacky-dry film while it is carried on the surface of the heating roll, stripping the tacky-dry adhesive film from the roll surface by pulling it under tension with or without the aid of a stripping knife, interposing the adhesive film between a pair of veneers, and pressing the veneers to each other to bond them.

9 Claims, 2 Drawing Figures

PLYWOOD MANUFACTURING METHOD AND APPARATUS

BACKGROUND OF THE INVENTION

This invention relates to a method for manufacturing a plywood using an improved veneer bonding technique.

In prior art techniques of bonding veneers for plywood manufacture, it is well known that poor adhesion such as puncture and deficient bond strength largely depends upon the extent of drying of veneers, that is, the moisture content of veneers.

However, it is impossible at the present state of the art to dry a number of veneers to an equal moisture content, and veneers are dried to a more or less varying extent. Particularly, the recent deterioration of log stock results in a mixed supply of difficult- and easy-to-dry woods. With the increased extent of drying, over-drying results in excessive shrinkage and corrugation of veneers. With the reduced extent of drying, on the other hand, under-drying results in poor adhesion. In connection with veneer drying, a number of problems arise at the site of manufacture.

The only one solution for the present status depends on the development of a practical gluing technique which is completely or substantially independent from variable moisture contents. To essentially eliminate these problems, it is necessary to establish a technique capable of gluing veneers having a high moisture content at low cost.

One technique of gluing veneers having a high moisture content is disclosed in Japanese Patent Application Publication No. 54-3929 titled "Plywood Manufacturing Method". According to the method of this patent publication, a plywood adhesive fluid of well-known formulation is applied to a veneer and dried thereon, and another veneer is placed on the adhesive-applied veneer followed by hot pressing. Although the results described in the patent publication are satisfactory, I found that this technique has the following problems. With a dryer equipped for the purpose of drying the adhesive applied and set to proper drying conditions including temperature and time, the adhesive applied on those veneers having a lower moisture content is over-dried and the adhesive applied on those veneers having a higher moisture content is under-dried, failing to dry the adhesive applied to a desired extent for all veneers. As a result of the varying dryness of the adhesive, the bond strength achieved by hot pressing also varies over a wide range.

In the examples described in the patent publication, drying conditions are changed in accordance with the moisture content of veneers to be handled, and more specifically, the higher the moisture content of veneers, the higher the drying conditions are set. The dryness of the adhesive applied not only depends on the selected adhesive drying conditions, but largely depends on the moisture content of veneers. The varying bond strength is attributable to this fact. Consequently, the dryer for drying the adhesive applied to veneers must be of size and capacity as large as the conventional veneer dryers. Besides, it is well known that there is a significant difference between sapwood and heartwood portions of the same log and between spaced portions of the same veneer. From a standpoint of view of manufacturing plywoods of consistent quality from a variety of starting logs, the above-mentioned shortcomings of the prior art techniques are difficult to overcome in the actual forms of plywood manufacture requiring large-scale production and prevent commercial application of such techniques.

An object of this invention is to eliminate the above-mentioned shortcomings involved in the prior art techniques and to provide a novel and improved technique for firmly bonding veneers, even highly wet veneers if necessary, at low cost independent of the moisture content of veneers so that the technique may be readily applied to commercial manufacture.

SUMMARY OF THE INVENTION

According to one aspect of the present invention, there is provided a method for manufacturing a plywood, comprising applying an aqueous plywood adhesive fluid to a carrier surface travelling in a given direction to form an adhesive fluid film, drying the adhesive fluid film on the carrier surface to reduce the water content of the adhesive fluid applied, stripping the adhesive film from the carrier surface, and then interposing the adhesive film between a pair of veneers to form a plywood. The present invention is similar to the technique of the above-mentioned patent publication in that the water content of an adhesive is forcedly reduced to enable bonding of highly wet veneers, but is different in that an adhesive is applied to veneers before it is dried thereon in the latter while an adhesive is dried into a film prior to being interposed between veneers in the present invention. The invention allows the adhesive dryer to be substantially reduced in size and the adhesive to be uniformly dried to a desired extent in accordance with the selected drying conditions, completely eliminating the shortcomings of the technique of the above-mentioned patent publication.

According to a second aspect of the present invention, there is provided an apparatus for manufacturing a plywood comprising (a) a carrier surface travelling in a given direction, (b) means for applying an aqueous plywood adhesive fluid to the carrier surface to form an adhesive fluid film, (c) means for drying the adhesive fluid film on the carrier surface to reduce the water content of the film, (d) means for stripping the adhesive film from the carrier surface, and (e) conveyor means for interposing the adhesive film between veneers and conveying the veneers in face-to-face relationship.

In a preferred embodiment, the carrier surface is composed of the peripheral surface of a roll, more preferably, the peripheral surfaces of a series of rolls. One roll may function to apply an adhesive fluid to the peripheral surface of another roll, which may advantageously be a heating roll because the heating roll can provide the double functions of presenting the carrier surface and drying the adhesive fluid film.

BRIEF DESCRIPTION OF THE DRAWING

The above and other objects and advantages of the present invention will be more fully understood from the following description when taken in conjunction with the accompanying drawings, in which.

DESCRIPTION OF THE PREFERRED EMBODIMENTS

Figure 1:
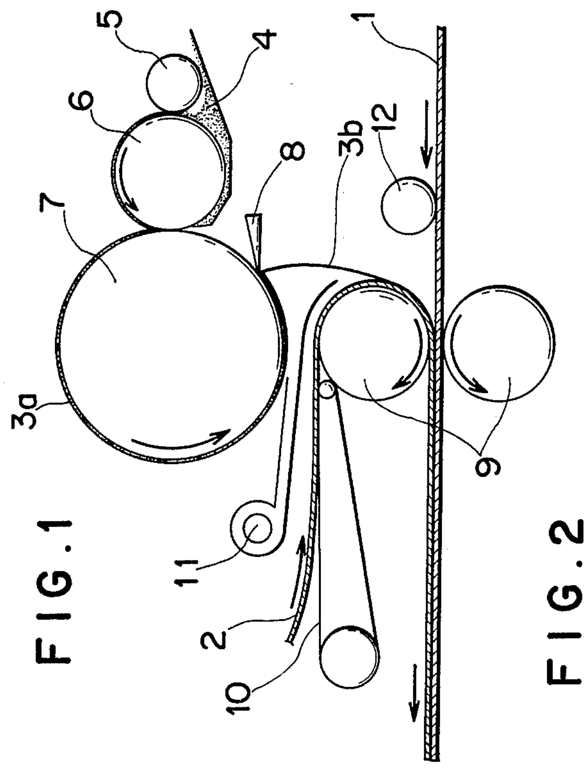
FIG. 1 is a schematic illustration of one embodiment of the plywood manufacturing apparatus of the present invention.

Referring to FIG. 1, there is illustrated one preferred embodiment of the plywood manufacturing apparatus of the present invention, which includes a series of a doctor roll 5, an applicator roll 6, and a heating roll 7. As seen from the figure, the doctor roll 5 serves to apply an adhesive fluid 4 to the peripheral surface of the applicator roll 6 rotating in the direction of an arrow to form an adhesive fluid film 3*a*. The adhesive fluid film 3*a* is transferred to the peripheral surface of the heating roll 7 at the point of contact between the applicator and heating rolls 6 and 7. As the adhesive fluid film 3*a* is carried with the peripheral surface of the heating roll 7 in the direction of an arrow, water in the adhesive fluid is evaporated off to a proper extent. The adhesive film 3*b* is then stripped from the surface of the heating roll 7 with aid of a stripping knife 8. A blower 11 which is optionally installed blows air to the adhesive film 3*b* where it is stripped by means of the stripping knife 8, in order to facilitate the film formation of the adhesive immediately after stripping. The thus stripped adhesive film 3*b* is interposed between an upper veneer 2 carried by means of a conveyor 10 and a lower veneer 1 carried by means of another conveyor (not shown). A sandwich of the adhesive film between the veneers is passed between pressure rolls 9 to achieve a preparatory bond between the veneers and then carried out. When it is desired to manufacture a three-ply plywood, the resulting sandwich is reversed and then carried into another apparatus of the same construction as shown in FIG. 1 at the subsequent station instead of the lower veneer 1. An adhesive film 3*b* is interposed between the sandwich and another veneer fed instead of the upper veneer 2 in a similar manner, and then a three-ply laminate is carried out. A plywood having a desired number of veneers may be manufactured in a similar manner simply by interposing an adhesive film 3*b* between veneers to be joined. Though not shown in the figure, the subsequent procedure is to effect cold pressing followed by hot pressing in a conventional manner, or cold pressing with simultaneous curing, thereby accomplishing the bond of veneers.

Below are examples of forming a film from an adhesive fluid using the apparatus shown in FIG. 1. All parts and percents are by weight.

EXAMPLE 1

(1) The composition of an adhesive fluid: 100 parts of a melamine-urea co-condensation resin adhesive as a base glue (trade name S-Resin SA-30 manufactured and sold by Shoei Chemical Industry K.K.), 20 parts of flour, 4 parts of water, and 1 part of ammonium chloride.

(2) The spread of the adhesive fluid to the applicator roll 6 by the doctor roll 5: 166.6 g/cm$^2$.

(3) The ratio in peripheral speed of the applicator roll 6 to the heating roll 7: 1:1.

(4) The temperature of the heating roll 7: 90° C.

(5) The time for which the adhesive spread in the form of a film is retained on the heating roll 7: 18 seconds.

(6) The ratio of the peripheral speed of the heating roll 7 to the speed of feed of the adhesive film 3*b* between veneers: 1:1.

(7) Blowing by the blower 11: off.

An adhesive film 3*b* was tacky-dry, that is, flexible and tacky to the fingertip in soft touch when it was dried and stripped from the heating roll 7 by means of the stripping knife 8 under the above-mentioned conditions.

The adhesive film 3*b* prepared as above was interposed between a pair of veneers by following the above-described procedure to make a three-ply plywood, which was subjected to an adhesive strength test with the following results. More specifically, using face and back veneers having a moisture content of 10% and a thickness of 1.7 mm and a core veneer having a moisture content varying from 0% to 120% and a thickness of 3.6 mm, type I plywoods were made by the above-mentioned procedure of the invention followed by a hot pressing at 115° C. for 3 minutes.

According to the repetitive boiling test prescribed by the JAS, the plywoods were measured for bond strength. The bond strength reached a peak for those plywoods using cores having a moisture content ranging from about 30% to about 55% although the other plywoods using cores having a moisture content outside this range showed a fairly good bond strength. A similar test was carried out on plywoods using a drier adhesive film 3*b* which was prepared by the same procedure as in Example 1 except that parameters (4) and (5) were changed. The maximum bond strength appeared in those plywoods using a core having a higher moisture content than in the previous test. On the other hand, when an adhesive film dried to a less extent was used, those plywoods using a core having a lower moisture content showed the maximum bond strength.

EXAMPLE 2

Parameters (1), (3) and (4) were the same as in Example 1, but parameter (2) was changed to 500 g/cm$^2$, parameter (5) was changed to 25 seconds, parameter (6) was changed to 2:3, and parameter (7) was changed to "on".

An adhesive film prepared under these conditions was more flexible and more tacky than that prepared in Example 1. Using face/back veneers having a moisture content between 0% and 60% and a thickness of 1.7 mm and core veneers having a moisture content between 0% and 60% and a thickness of 1.7 mm, three-ply plywoods were manufactured with various combinations of veneers different in moisture content by 15% and determined for bond strength by the above-mentioned test method. The maximum bond strength appeared when either of the face/back and core veneers had a moisture content of 0%, and there was found the tendency that the bond strength decreased as the moisture content of either one of the veneers increased. Plywoods using veneers all having a moisture content of 0% exhibited a lower bond strength than plywoods using face/back and core veneers, one having a moisture content of 0% and the other having a moisture content of 15% or both having a moisture content of 15%. The bond strength decreased as both the veneers increases their moisture content and reached about 7.1 kg/cm$^2$ (arithmatic average value) when both the veneers had a moisture content of 60%.

Additional examples were repeated including the manufacture of five-ply plywoods, type II plywoods and special plywoods. As a result of these experiments, it is concluded that when the spread or weight per unit area of the adhesive fluid film 3*a* as prepared in Examples 1 and 2 is varied within a proper range, the bond strength increases in proportion to the spread.

Next, the drying and formation of an adhesive fluid into a film which is a key in the practice of the invention will be described in detail to clarify several important factors.

First of all, the plywood adhesive fluid will be described. The adhesives which can be used in the present invention are aqueous plywood adhesives based on a thermosetting resin, for example, urea resin, melamine resin, phenol resin, dihydrazide resin, vinyl urethane resin, and modified resins, co-condensed resins and mixed resins thereof. In general, these adhesives are commercially available or prepared in the form of an aqueous solution of either concentrated or non-concentrated type containing about 35% to 55% by weight of water. An adhesive fluid of any desired formulation may be prepared by selecting any one of the above-mentioned adhesives as a base glue and adding water, an extender such as flour, and a curing agent such as ammonium chloride if necessary, and optional additives such as fillers, thickeners and plasticizers. The adhesive fluid is prepared so as to contain about 30% to 70% by weight of water, preferably to a relatively low water content. Adhesive fluids having a low water content the slightly more viscous than conventional adhesive fluids, but are free of any spreading problem because they are not directly spread on the veneer surface. By way of illustration, the adhesive fluid used in the above Experiments had a viscosity of 58 poise and a water content of about 40%. It is to be noted that in the practice of the invention, teachings as to composition and blending, additives and curing of adhesives described in a variety of publications and the literature may be optionally adopted. The followings are incorporated by reference: Japanese Patent Publication Nos. 35-18596, 50-20576, 50-25491, 51-22497, 52-42181, 52-495, 53-12532, and 55-24401 and the article "Recent Situation of Phenol-Melamine Resin Adhesives", *Mokuzai Kogyo,* 36, No. 7, pages 9–14.

According to the present invention, water removal is effected on the adhesive fluid film to reduce the water content thereof in order to form a tacky-dry adhesive film. The apparatus is set to such drying conditions that the adhesive film 3*b* has generally a water content of about 15% to 40%, preferably about 18% to 35%. When the drying of the adhesive fluid film is carried out under heating conditions as in the apparatus shown in FIG. 1, heating also promotes the condensation reaction of the base glue so that a film having a relatively high water content may be formed. That is, not only the reduction of water content, but also the progress of condensation reaction of base glue contribute to the formation of a film from the adhesive. However, the excessive promotion of condensation will cause the adhesive film to reduce its bonding capacity or lose its tackiness before it reaches the desired dryness. Accordingly, heat drying may desirably be effected at a temperature between 40° C. and 100° C.

Nevertheless, drying at a higher temperature ranging from 100° C. to 150° C. has the great advantage of a very short time required to achieve the desired dryness. If desired, drying at such a higher temperature may be intentionally carried out while the progress of condensation reaction is controlled. For example, the amount of a curing agent such as ammonium chloride is reduced to a minor amount or zero, or a pH regulator such as hexamethylenetetramine is added so as to regulate the pH of the adhesive fluid to a weakly acidic, neutral or alkaline range before a drying treatment is carried out. Such pH control of the adhesive may also be used when drying is effected with the heating roll at an elevated temperature of 40° C. to 100° C. or at room temperature without heating. When the adhesive is pH controlled, it is desired to apply an acidic agent such as ammonium chloride to the adhesive film after drying or to that surface of a veneer to be joined to the adhesive film for re-adjustment of pH in order to improve the curing of the adhesive under hot or cold pressing. The degree of condensation of a base glue used may be previously set low by taking into account the progress of condensation reaction at a particular temperature. However, if the progress of condensation reaction does not give rise to such problems as deterioration of bond performance and loss of adherence, base glues of high condensation type having an increased degree of condensation may be used.

In addition, the flexibility of the adhesive film is important to ensure the smooth and stable supply or interposition of the film between veneers and the subsequent intimate contact of the film with the veneers. Any well-known plasticizer may be added to the base glue if necessary. For amino resin base adhesives, for example, a plasticizer such as tricresyl phosphate and cresyl diphenyl phosphate may be added in a suitable amount. Such a plasticizer also functions as a lubricant and somewhat improves the release properties of the adhesive film. However, basically, the flexibility of the adhesive film largely depends upon the dryness thereof. That is, adhesive films having a relatively high water content are more flexible whereas adhesive films having a relatively low water content are less flexible. For the sake of comparison, adhesive films were prepared by repeating the procedure of Example 1 except that parameter (2) was changed to 333.3 g/cm$^2$, parameter (5) was 37 seconds, and parameter (6) was 2:3, 1:2 and 1:3. The adhesive films stripped had a water content of about 32% and was more flexible and tacky than those of Example 1.

When the ratio of the peripheral speed of the heating roll 7 to the speed of feed of the adhesive film 4 between veneers, parameter (6), is changed from 1:1 to 2:3, 1:2 and 1:3, the adhesive fluid film on the heating roll is formed under tension into a film which decreases its thickness with the acceleration of the feed speed. By making use of such acceleration or tension stripping, the thickness of the adhesive film may be adjusted to any desired value meeting the conditions of veneers to be joined. More specifically, the apparatus shown in FIG. 1 is constructed such that the speed of travel of the veneer conveyors 10 may be adjusted relative to the peripheral speed of the heating roll 7. Of course, the heating roll 7 whose peripheral speed may be reduced will suffice for the purpose.

The tension stripping enables the properly dried adhesive film to be stripped from the peripheral surface of the heating roll 7 at a position upstream of the stripping knife 8. Differently stated, the adhesive film is stripped from the carrier surface by pulling the film under tension. In this case, the position at which the adhesive film 3*b* is stripped can be set without the need for a stripping device such as the stripping knife 8.

In either case, it is desired in the practice of the invention to prepare the adhesive film as tacky as possible and immediately feed it between veneers. Desirably, the adhesive film as prepared is tacky-dry, that is, tacky or sticky to the softly touching fingertip. Such a tacky-dry adhesive film is ready to achieve fully preparatory bond of veneers after they are pressed to each other by means of the pressure rolls 9 shown in FIG. 1. To achieve sufficient bond strength, the tackiness is important in view of the so-called wetting. Tack-free adhesive films will result in a low bond strength because of insufficient penetration of the adhesive into veneers.

Figure 2:
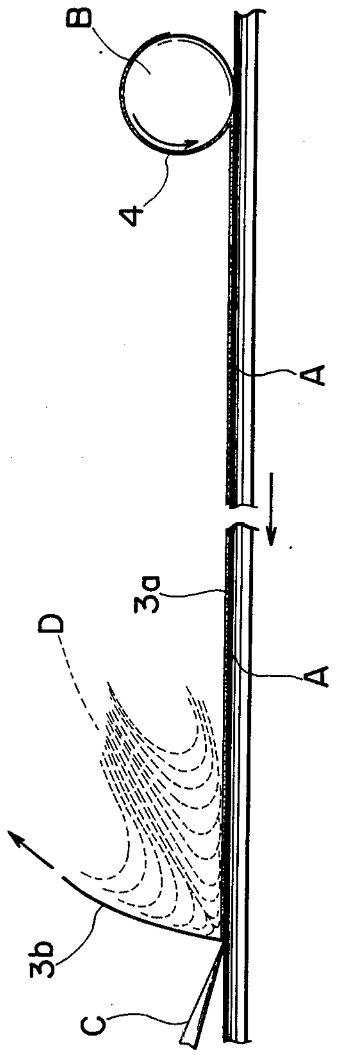
FIG. 2 is an enlarged view illustrating the action of air blowing on an adhesive film where it is stripped from the carrier surface.

In the preparation of a tacky-dry adhesive film, the blower 11 shown in FIG. 1 is a useful auxiliary device. For example, if the blower 11 is interrupted in Example 2, the adhesive film begins to tear or break away immediately after stripping and the film formation becomes almost impossible or very difficult. With the blower 11 actuated, a tacky, very thin adhesive film may be formed even when the speed ratio defined as parameter (6) is increased to 1:6. More particularly, as shown in FIG. 2, a blower D is placed above the adhesive film 3*a* near a position determined by a stripping device C located above a carrier surface A. By moderately blowing air to the adhesive film immediately before and/or after stripping from the carrier surface A, the cohesion phenomenon that the adhesive film 3*b* gives rise to immediately after stripping is controlled to achieve the above-mentioned effect. It is believed that the cohesion control results directly from the cooling by air blowing, and therefore, air blowing may be replaced by any other cooling means if necessary. Alternatively, the above-mentioned phenomenon due to abrupt temperature drop may be mitigated by properly heating the adhesive film immediately after stripping. In either case, though the cause of the phenomenon is not fully recognized, the blower D which operates as shown in FIG. 2 is desirably provided. The temperature of gases blown by the blower, typically air, is not limited to room temperature, but may be set to a proper lower or higher level. It is to be noted that the carrier surface A is depicted in FIG. 2 as a flat surface which represents the planar surface of a belt or the circumferential surface of a roll. B is a roll coater for applying an adhesive fluid 4 to the carrier surface A to form an adhesive fluid film 3*a*.

The above description refers to the fundamental factors for forming a tacky-dry adhesive film from an adhesive fluid. Next, the apparatus with which the method of the present invention is carried out will be described with reference to the illustrated and other embodiments.

In FIG. 1, reference is first made to two rolls, the applicator roll 6 and the heating roll 7 in tangential contact. These two rolls each have a peripheral surface which constitutes a carrier surface travelling in a given direction at a given speed. More specifically, they present a travelling surface serving as a carrier for the adhesive fluid 4 over a range extending from the coating position where the plywood adhesive fluid 4 is applied to the peripheral surface of the applicator roll 6 by means of the doctor roll 5 to the stripping position defined by the stripping knife 8. The heating roll 7 not only constitutes a part of the carrier surface, but also functions as a dryer for reducing the water content of the adhesive fluid film 3*a*. The applicator roll 6 may be optionally cooled to keep the adhesive fluid 4 at a low temperature immediately before its application such that the spread of the adhesive fluid by the doctor roll 5 may be kept constant and the adhesive fluid film may be smoothly transferred to the heating roll 7. That is, the applicator roll 6 is provided mainly for the purpose of eliminating coating barriers which otherwise result from the heat transfer from the heating roll 7. If no particular coating barrier is encountered, for example, if the heating roll 7 is set to a relatively low temperature, the provision of such an applicator roll and other cooling means is unnecessary. Accordingly, as the case may be, a roll coater such as the doctor roll 5 may be placed in direct contact with the peripheral surface of the heating roll 7 to define the position of application of the adhesive fluid 4. In this case, the carrier surface is defined by a single member, that is, by the peripheral surface of one roll, and drying means acts to effect water removal from the adhesive over the entire region extending from the coating position to the stripping position.

On the other hand, the doctor roll 5 may be cooled if necessary so as to ensure the stable application of adhesive fluid to the carrier surface. If it is desired that the spread to the carrier surface is adjustable, the clearance between the doctor roll and the carrier surface, or the direction of rotation of the doctor roll with respect to the travelling direction of the carrier surface, or the number of revolution of the doctor roll may be adjusted. The doctor roll 5 may be replaced by any suitable applicator such as a blade coated and spray as long as it can apply, cast, spread or spray the adhesive fluid in the form of a thin film on the carrier surface.

If two or more members, for example, two rolls, the applicator and heating rolls 6 and 7 in the illustrated embodiment, or two endless belts or an endless belt and a roll (not shown) are combined to define a series of carrier surface segments divided in the travelling direction, then the travelling speed of each carrier surface segments may be individually adjusted. In the illustrated apparatus, for example, the ratio of the peripheral speeds of the applicator roll 6 to the heating roll 7 may be set to 1:2 or 2:1 as well as 1:1 used in the previous examples. The adjustment of the travelling speed ratio enable the thickness of the adhesive fluid film 3*a* on the carrier surface to be adjusted as desired at the time of its transition.

The carrier surface need not necessarily be composed of a smooth surface. For example, the applicator roll 6 used in the illustrated apparatus may be provided on its rubber-coated peripheral surface with a plurality of screw-like small channels as in conventional spreader rolls. Alternatively, the heating roll 7 may have a hard chromium plating thereon, presenting a smooth rigid surface. The heating roll may also be provided with an irregular pattern on the peripheral surface if necessary. Since the configuration of the carrier surface has an influence on the adhesive film, it must be determined in consideration of the form of the adhesive fluid film 3*a*. More specifically, the configuration of the carrier surface may be determined depending on the geometry of the adhesive film including even films having a thickness of 0.03 mm, 0.07 mm, 0.1 mm, 0.15 mm or 0.2 mm, films whose thickness varies in the feed or transverse direction, films consisting of transversely jaxtaposed narrow strips or bands severed and separated along lines parallel to the feed direction, films consisting of very narrow yarn-like strips transversely jaxtaposed so as to form a film as a whole, and films of other desired geometry. Since the carrier surface is also closely related to the conditions under which the adhesive fluid 4 is applied thereto by means of the applicator, the formation of the desired adhesive film depends on the control of application procedure and/or the configuration of the carrier surface.

The dryer for drying the adhesive applied on the carrier surface will be described. In the illustrated embodiment, the dryer is mainly composed of the heating roll 7 whose surface is heated by circulating a heating medium into the roll interior as described above. In this case, the dryer heats the applied adhesive from one surface thereof. Another dryer may be used which can heat the applied adhesive from the both surfaces thereof. Also, a microwave dryer may be provided so that the adhesive film may be internally heated. These are heating dryers of heat radiation, heat convection and heat conduction types capable of heating at a certain temperature, and any suitable type or any combination of different types may be used. In addition, cold air dryers (blowing room-temperature air for drying) and vacuum dryers requiring no heat may also be used to carry out drying at room temperature. Of course, a dryer of the former type may be combined with a dryer of the latter type. In any case, the dryer is not strictly limited with respect to its position and working region as long as it can achieve the desired reduction of water content of the adhesive, or can dry the adhesive while the adhesive is moved on the carrier surface from the coating position to the stripping position. When the adhesive film stripped from the carrier surface at the stripping position defined by the stripping knife is to be further dried, such drying may be air drying or forced drying by means of an optional dryer.

As to the stripping means, any well-known stripping device of non-contact type such as an air knife may be used as well as the stripping knife 8 shown in FIG. 1. The stripping position defined by the stripping means is not necessarily set fixed, and may be movable, for example, by arranging the stripping knife 8 movable along the carrier surface, so that the dryness of the adhesive is conveniently adjusted. In the illustrated apparatus, the stripping knife 8 may be constructed to form a transfer mechanism such that the knife may be moved from the carrier surface toward the veneer to pull the leading edge of the adhesive film from the carrier surface to any desired position on the adhesive surface of a moving or stationary veneer and thereafter returned to the original position in contact with the carrier surface. Then, the initial feed of the adhesive film to veneers may be facilitated at the beginning of operation.

The veneer conveyor system may be of any construction as long as it allows the adhesive film to be interposed between the confronting surfaces of two veneers as in the illustrated embodiment. In the illustrated embodiment, the lower veneer 1 is carried along a linear path and the upper veneer 2 is carried along a curvilinear path around the upper pressure roll 9 both continuously or intermittently. The way of carrying veneers may be arbitrarily altered. In the illustrated embodiment, the conveyor system is arranged to feed the adhesive film 3*b* between two veneers such that the adhesive film first contacts the adhesive surface of the upper veneer and then the adhesive surface of the lower veneer. The adhesive film comes in contact with the surface of one veneer for a short time or over a short distance before it comes in contact with the surface of the other veneer. Also, the adhesive film may be kept in contact with the surface of one veneer for a long time or over a long distance before it comes in contact with the surface of the other veneer. It is, of course, possible to bring the adhesive film in contact with both the surfaces of the two veneers substantially at the same time. Further, the conveyor system may also be constructed such that the adhesive film extends parallel to the adhesive surfaces of two veneers with a spacing therebetween and the veneers are brought in contact with the adhesive film at the same time over a certain area. In such a case, the adhesive film extending adjacent veneers is regarded as being interposed between the veneers.

It is not necessarily required to press two veneers with the adhesive film sandwiched therebetween by means of the pressure rolls 9 as in the illustrated embodiment. It may suffice that the adhesive film is interposed between the veneers simply by gravity because pressing for preparatory bond may be effected in the subsequent step. The pressure rolls 9 may preferably be coated over the peripheral surface with an elastomer, and optionally be provided with a plurality of circumferential channels. Such channels allow conveyor members such as wire belts to extend therethrough to facilitate the curvilinear transport of a veneer. The pressure rolls 9 may be heated to a high temperature if desired.

The illustrated apparatus is a typical example of the apparatus for the handling of two veneers. If three veneers are to be handled, the apparatus is modified as follows. To the illustrated apparatus are added another conveyor for conveying an additional veneer to the lower pressure roll 9, which is similar to the conveyor 10 for the upper veneer 2, and another adhesive film-forming device placed below the veneer 1. Then, as in the illustrated embodiment, an additional adhesive film may also be fed and interposed between the veneer 1 (which is press joined as a core to the veneer 2 through a pair of pressure rolls 9) and the additional veneer fed from below the veneer 1. Then a three-ply plywood in a preparatory bond state emerges from the pressure rolls 9. If a three-ply plywood emerging from the pressure rolls 9, whether or not the adhesive is cured and the grain direction is re-oriented, is again fed to such an apparatus instead of the core veneer 1, then a five-ply plywood emerges from the pressure rolls 9. Of course, instead of such re-entry, the apparatus may be followed by another apparatus of the same type such that a plywood emerging from the upstream apparatus is carried to the downstream apparatus as a core with or without re-orientation of its grain direction.

As understood from the foregoing, the apparatus of the invention may be modified or altered into any desired composite type apparatus on the basis of the typical construction shown in the figures. In such apparatus, it is important that the veneer conveyors are designed to accommodate various factors of veneers including the grain direction and thickness.

Each of the veneers may be in the form of a series of veneer sheets cut to a given length with or without a spacing therebetween, and such veneer sheets may be conveyed one by one or continuously. Alternatively, one or both of the upper and lower veneers may be carried in the form of a continuous long web while the adhesive film is continuously interposed therebetween as described above.

The moisture content of veneers used will be described. In general, the adhesive film formed as above and having a lower water content exhibits a higher bond strength when used in the bonding of veneers having a higher moisture content, as described earlier. Accordingly, all veneers used are desirably pre-adjusted in moisture content so as to meet such tendency. The adjustment of moisture content may be effected by drying veneers uniformly throughout the venners from the surface to the interior or if necessary, mainly over a surface layer associated with the adhesive surface. If veneers used have a too high moisture content, then they are heated for a short time by means of any well-known heating device such as a heating platen or roll to dry a surface layer to be bonded, and then carried to the step of interposition of an adhesive film and preferably, to the subsequent steps of cold and hot pressing while a difference in moisture content remains between the surface layer and the interior of the veneers.

The temperature of veneers may be increased before the veneers are carried into the apparatus of the invention. Since the heat of veneers themselves will sometimes contribute to adhesive curing in the subsequent hot or cold pressing step, a suitable heating device, for example, a heating roll 12 in FIG. 1, may be provided in some cases, for the purpose of increasing the temperature of veneers.

On the other hand, for those veneers having a too low moisture content, a humidifier is desirably provided to apply, for example, water, hot water, steam or a solution of a secondary agent in water such as formaline, various adhesives in water, and other aqueous acidic solutions such as diluted aqueous hydrochloric acid and aqueous ammonium chloride to the veneers by spraying or coating to wet a veneer surface layer to be bonded. Of course, the humidifier device may be used in combination with the above-mentioned veneer heating device.

In a preferred embodiment, the adhesive film may be adjusted so as to accommodate the moisture content of veneers used. For example, a moisture meter is provided in association with veneers to measure the veneer moisture content, and the dryness of the adhesive film may be automatically or manually adjusted on the basis of the measurements. Furthermore, another moisture meter may be provided to measure the water content of the adhesive film, and a humidifier spray for humidifying the adhesive film may be automatically or manually operated on the basis of the measurements of both the veneer and film moisture meters. In this case, the humidifier spray may preferably be combined with the blower 11. Further, the humidifier spray may be provided on each side of the adhesive film such that the amount of steam ejected for humidifying may be independently controlled in each humidifier.

The humidifier such as a humidifier spray is generally provided so as to act on the adhesive film after stripping, but may also be provided so as to act on the adhesive film on the carrier surface before stripping, if necessary. The humidifying medium is not limited to steam, and water, hot water, and solutions of secondary agent in water such as formaline, various adhesives in water, and other aqueous acidic solutions such as diluted aqueous hydrochloric acid and aqueus ammonium chloride may also be applied to the adhesive film. When such a water-based solution is applied to the adhesive film, the amount of water applied should be a minor amount of less than 55.5 g/m$^2$, preferably between 40 and 3 g/m$^2$, depending on the composition and dryness of the adhesive film.

Because of the reduced water content, the adhesive films tend to be less penetrative into veneers, particularly those veneers having an extremely low moisture content. In order to improve such a tendency, rehumidifying is very effective even though water is applied in a minor amount. For example, when the plywoods were manufactured using low moisture content veneers as face and back veneers and subjected to the bond strength test as in Example 1, adhesive failure almost occurred at the veneer-adhesive film interface. Plywoods were again manufactured in the same conditions except that steam was sprayed to the both surfaces of an adhesive film to retain about 9 g of water per square meters on each surface, and a bond strength test was carried out on them to find that the adhesion at the interface was substantially improved. On the contrary, when veneers having a low moisture content were adequately humidified over a surface layer to be bonded, or when veneers having a relatively high moisture content were used, similar tests demonstrated an improvement in adhesion.

As described above, the present invention provides a novel and improved plywood manufacturing method capable of bonding high-moisture-content veneers at low cost which are otherwise bonded in the prior art technique with substantial difficulty in commercial application because of increased cost, large size of apparatus and complexity of steps, as well as low-moisture-content veneers, thereby wholly overcoming the problems associated with difficult-to-control veneer drying including shrinkage, blister and poor adhesion, making a great contribution to the present and future art of plywood manufacture.

The above-mentioned apparatus for forming an adhesive film and feeding it between veneers has the significant advantage of substantially reducing the glue spread even when applied to the manufacture of plywoods from dry veneers as used in the prior art. The apparatus succeeds in uniform bonding with a small amount of adhesive independent of the moisture content of veneers, making a great contribution to the art in this sense too. The apparatus is not only used with veneers, but it may also be used as means for supplying an aqueous thermosetting adhesive in manufacturing laminates by overlapping and bonding sheet- or plate-like members of any materials such as sawn plates, plywoods, composite woods, wooden boards, paper sheets, plastic sheets and the like in any desired combination thereof.

What is claimed is:

1. A method for supplying an aqueous plywood adhesive between a pair of veneers in the manufacture of a plywood, comprising (a) applying an aqueous plywood adhesive fluid to a carrier surface travelling in a given direction to form an adhesive fluid film, (b) drying the adhesive fluid film on the carrier surface to reduce the water content of the film, (c) stripping the adhesive film from the carrier surface when the adhesive film becomes substantially tacky-dry, and (d) interposing the adhesive film between a pair of veneers.

2. The plywood manufacturing method according to claim 1 which further comprises (e) pressing the veneers having the adhesive film interposed therebetween.

3. The plywood manufacturing method according to claim 1 wherein the adhesive fluid having a water content of 30% to 70% by weight is dried in step (b) such that the adhesive film stripped from the carrier surface has a lower water content of 15% to 40% by weight.

4. The plywood manufacturing method according to claim 3 wherein drying of step (b) is carried out such that the adhesive film stripped from the carrier surface has a water content of 18% to 35% by weight.

5. The plywood manufacturing method according to claim 1 wherein drying of step (b) is carried out by heating the adhesive fluid film on the carrier surface to a temperature between 40° C. and 100° C.

6. The plywood manufacturing method according to claim 1 wherein the adhesive film is stripped from the carrier surface by pulling the adhesive film at a speed higher than the travelling speed of the carrier surface before the adhesive film is interposed between the veneers.

7. The plywood manufacturing method according to claim 1 which further comprises blowing air to the adhesive film before and/or after it is stripped from the carrier surface.

8. The plywood manufacturing method according to claim 1 which further comprises applying a minor amount of water to the adhesive film or the veneers before the adhesive film is interposed between the veneers.

9. The plywood manufacturing method according to claim 1 which further comprises heating the veneers before the adhesive film is interposed between the veneers.

* * * * *

UNITED STATES PATENT AND TRADEMARK OFFICE

CERTIFICATE OF CORRECTION

PATENT NO. : 4,483,730

DATED : November 20, 1984

INVENTOR(S) : Noriyuki Honda

It is certified that error appears in the above-identified patent and that said Letters Patent are hereby corrected as shown below:

Column 3, line 58, change "166.6 $g/cm^2$" to --166.6 $g/m^2$--

Column 4, line 37, change "500 $g/cm^2$" to --500 $g/m^2$--

Column 6, line 37, change "333.3 $g/cm^2$" to --333.3 $g/m^2$--

Signed and Sealed this

*First* Day of *October 1985*

[SEAL]

*Attest:*

DONALD J. QUIGG

*Attesting Officer*

*Commissioner of Patents and Trademarks—Designate*